United States Patent
Jahagirdhar et al.

(10) Patent No.: US 8,972,763 B2
(45) Date of Patent: Mar. 3, 2015

(54) METHOD, APPARATUS, AND SYSTEM FOR ENERGY EFFICIENCY AND ENERGY CONSERVATION INCLUDING DETERMINING AN OPTIMAL POWER STATE OF THE APPARATUS BASED ON RESIDENCY TIME OF NON-CORE DOMAINS IN A POWER SAVING STATE

(75) Inventors: Sanjeev S. Jahagirdhar, Folsom, CA (US); Ryan Wells, Folsom, CA (US); Inder Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 596 days.

(21) Appl. No.: 13/311,475

(22) Filed: Dec. 5, 2011

(65) Prior Publication Data

US 2012/0173904 A1    Jul. 5, 2012

(51) Int. Cl.
G06F 1/32    (2006.01)

(52) U.S. Cl.
CPC ............ *G06F 1/3206* (2013.01); *G06F 1/3228* (2013.01); *G06F 1/324* (2013.01); *G06F 1/3296* (2013.01)
USPC ............................ 713/324; 713/320; 713/323

(58) Field of Classification Search
CPC ....... G06F 1/32; G06F 1/3203; G06F 1/3206; G06F 1/3228; G06F 1/3243; G06F 1/3275; G06F 1/3287; G06F 1/329; G06F 1/3293
See application file for complete search history.

(56) References Cited

U.S. PATENT DOCUMENTS

| | | | |
|---|---|---|---|
| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,016,548 | A | 1/2000 | Nakamura |

(Continued)

FOREIGN PATENT DOCUMENTS

| | | |
|---|---|---|
| EP | 1 282 030 A1 | 5/2003 |
| EP | 2383648 | 11/2011 |
| TW | 201030506 A1 | 8/2010 |

OTHER PUBLICATIONS

International Searching Authority, "Notification of Transmittal of the International Search Report and the Written Opinion of the International Searching Authority," mailed Apr. 29, 2013, in International application No. PCT/US2012/068039.

(Continued)

*Primary Examiner* — Tanh Nguyen
(74) *Attorney, Agent, or Firm* — Trop, Pruner & Hu, P.C.

(57) ABSTRACT

A processor may determine the actual residency time of a non-core domain residing in a power saving state and based on the actual residency time the processor may determine an optimal power saving state (P-state) for the processor. In response to the non-core domain entering a power saving state, an interrupt generator (IG) may generate a first interrupt and the device drivers or an operating system may use the first interrupt to start a timer (first value). In response to the non-core domain exiting the power saving state, the IG may generate a second interrupt and the device drivers or an operating system may use the second interrupt to stop the timer (final value). The power management unit may use the final and the first value to determine the actual residency time.

20 Claims, 3 Drawing Sheets

(56) References Cited

U.S. PATENT DOCUMENTS

| | | |
|---|---|---|
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,694,160 B2 * | 4/2010 | Esliger et al. ............ 713/320 |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0072180 A1 | 3/2011 | Lee |
| 2011/0154090 A1 | 6/2011 | Dixon et al. |
| 2012/0173904 A1 * | 7/2012 | Jahagirdhar et al. ............ 713/320 |

OTHER PUBLICATIONS

U.S. Appl. No. 12/889,121, "Providing Per Core Voltage and Frequency Control," filed Sep. 23, 2010, by Pakaj Kumar.

SPEC—Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

U.S. Appl. No. 13/422,476, entitled "Managing Power Consumption in a Multi-Core Processor," filed Mar. 16, 2012 and which claims priority to Indian patent application No. 773/DEL/2011, filed on Mar. 21, 2011, by Eric Fetzer, et al.

Intel Developer Forum, IDF2010, Opher Kahn, et al., "Intel Next Generation Microarchitecture Codename Sandy Bridge: New Processor Innovations," Sep. 13, 2010, 58 pages.

Taiwan Patent Office, Office Action Mailed Sep. 15, 2014, In Taiwan Application No. 101145657.

\* cited by examiner

METHOD, APPARATUS, AND SYSTEM FOR ENERGY EFFICIENCY AND ENERGY CONSERVATION INCLUDING DETERMINING AN OPTIMAL POWER STATE OF THE APPARATUS BASED ON RESIDENCY TIME OF NON-CORE DOMAINS IN A POWER SAVING STATE

FIELD

This disclosure pertains to energy efficiency and energy conservation in integrated circuits, as well as code to execute thereon, and in particular but not exclusively, to determine an optimal power state in of the integrated circuit based on the power state residency of a non-CPU domain.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume approximately 13% of the entire electricity supply for the United States of America. As a result, there is a vital need for energy efficiency and conservation associated with integrated circuits. And as servers, desktop computers, notebooks, ultra-books, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on The United States economy, as computing device related sales already have a large causal relationship with The United States Gross Domestic Product. Though specific statistics relevant to the United States of America have been presented here, the need for enhancing energy efficiencies and reducing energy or power consumption are applicable throughout the world.

For example, a computer system may comprise a processor, which may include multiple processing cores, an uncore area, a graphics processing unit, and many such processing blocks. One or more of these blocks may be operating on different and independent clock frequencies and may be, generally, referred to as "multi-frequency domains". The domains (e.g., GPU, uncore) other than the processing cores domain (or core domain) may be referred to as non-core domain. The residency time of the cores in the power saving (or C) states (such as C0 to C7) may be determined by the power control unit or the operating system or the device drivers. However, the current techniques merely estimate the residency time of the non-core domains such as the GPU and such estimated residency times are mere estimates and may not be accurate or represent the actual residency times. As a result, a power state (or P-state) for the processor determined based on the estimated residency times of the non-core domains may not be optimal and power saving opportunities may be lost.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique to determining an optimal power state of the apparatus based on the power state residency in a non-core domain. In the following description, numerous specific details such as logic implementations, resource partitioning, or sharing, or duplication implementations, types and inter-relationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop and laptop computer systems and may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US or world economy.

In one embodiment, the processor may determine the actual residency time of the non-core domains in a power saving state(s) and based on the actual residency time the processor may determine an appropriate P-state for the processor. In one embodiment, the processor may include a power control unit, an interrupt generation unit, and one or more timers or counters to determine the actual residency time of one or more non-core domains (a graphics processing unit, for example). Based on the residency time of the GPU, for example, in the power saving states (C1-C7, for example) the processor may determine the P-state for the processor. As a result, the processor may choose an optimal P-state for the processor and the power saving opportunities may be well utilized to conserve power in the processor.

In one embodiment, the interrupt generation unit may generate a first interrupt in response to the non-core domain entering a power saving state (or C-state). In one embodiment, the interrupt generation unit may receive a first signal from the power control unit or one of the processing cores in the core area. In one embodiment, a processing core may poll a status register to determine whether the non-core domain has entered a power saving state and send a first update signal to the power control unit. In other embodiment, the processing core may directly send the first signal to the interrupt generation unit. In one embodiment, a device driver or an operating system or a power control unit may use the first interrupt to start a timer or a counter. In one embodiment, the timer may start at a first value in response to receiving a signal from one of the device driver or the OS or the PCU. In one embodiment, the start value may be copied to a register for computing the residency time of the non-core domain at a later time point. In other embodiment, the start value may be configured by a user or one of the processing cores and the configured start value may be loaded to the counter in response to the OS or the device driver receiving the first interrupt.

In one embodiment, the interrupt generation unit may receive a second signal in response to the non-core domain exiting the power saving state. In one embodiment, the processing core may send a second update signal to the power control unit, which in turn may send the second signal to the interrupt generation unit. In other embodiment, the processing core may directly send the second signal to the interrupt generation unit. In one embodiment, the interrupt generation unit may generate a second interrupt in response to receiving the second signal. In one embodiment, the OS or the device driver or one of the processing cores may send a stop or halt signal to the timer.

In one embodiment, a final value registered by the timer may be stored to a register. In one embodiment, the final value and the first value may be used to determine the actual residency time of the non-core domain in a power saving state. In one embodiment, the actual residency time values may be used to determine an optimal power saving state for the processor. In one embodiment, the power control unit may determine the optimal power saving state for the processor based on the actual residency time values. As a result, the optimal power saving state chosen for the processor may provide opportunities to save conserve more power compared to the power saving state chosen based on an estimate of the residency time.

Figure 1:
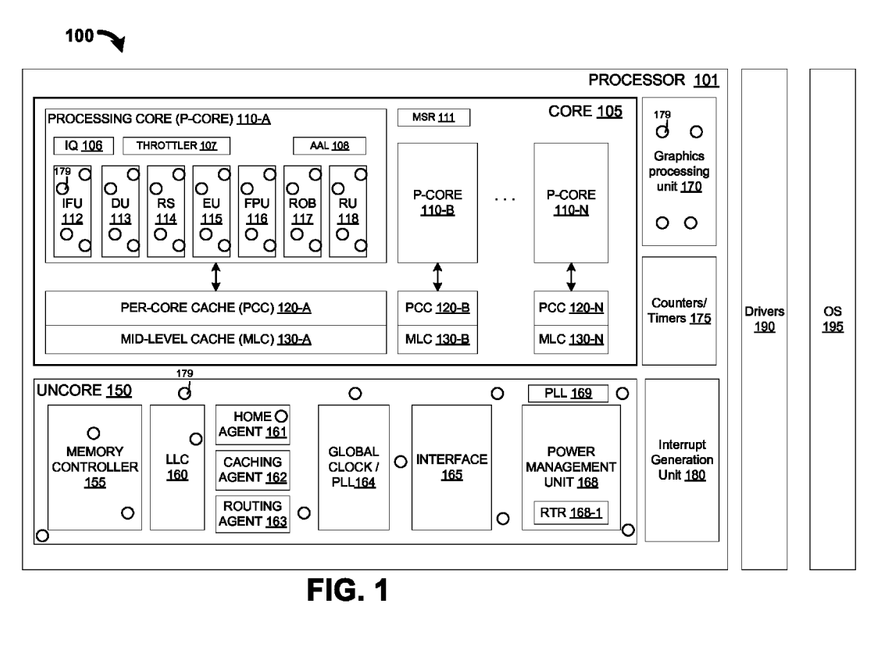
FIG. 1 illustrates a processor 100, which may determine the residency time of one or more non-core domains in the power saving states in accordance with one embodiment.

An embodiment of a processor 101, which may determine an optimal power saving state for the processor based on the actual residency time of the non-core domain in a power saving state, is illustrated in FIG. 1. In one embodiment, the processor 100 may comprise many domains such as a core 105, an uncore 150, a graphics processing unit GPU 170, a counters/timers 175, and the interrupt generation unit 180. In one embodiment, any domain other than the core domain 105 may be referred to as "a non-core domain". For example, the graphics processing unit (GPU) 170 may be one of the non-core domains. Also, for brevity only three domains are depicted in the FIG. 1, however, the processor 101 may include many such domains and each domain (either core or non-core) may operate at a different clock frequency value and such domains may also be referred to as multi-frequency domains. In one embodiment, the core 105 may include many processing cores (P-cores) such as 110-A to 110-N, per-core caches 120-A to 120-N associated with the p-cores 110-A to 110-N, respectively, and mid-level caches 130-A to 130-N associated with the p-cores 110-A to 110-N, respectively. In one embodiment, the core 105 and the uncocre 150 may support a point-to-point bi-directional buses to enhance communication between the processing cores (p-cores) 110 and between the core area 105 and the uncore area 150.

In one embodiment, each of the p-cores 110 may include a an instruction queue IQ 106, throttler 107, an activity accumulation logic AAL 108, an instruction fetch unit IFU 112, a decode unit 113, a reservation station RS 114, an execution unit EU 115, a floating point execution unit FPU 116, a re-order buffer ROB 117, and a retirement unit RU 118. In one embodiment, each P-core 110-A to 110-N may represent an independent domain. In other embodiment, all the p-cores 110-A to 110-N may together be referred to as a single independent domain if the each of the p-cores 110-A to 110-N operate at the same clock frequency. The power management techniques described above are applicable to any of the scenarios described above and many other scenarios in which there are portions of the processor 100 that may be referred to as the non-core domain. Here, for brevity, all the p-cores 110-A to 110-N are represented as a single domain i.e., the core 105.

In one embodiment, each processor core 110-B to 110-N may include blocks that are similar to the blocks depicted in the processing core 110-A and the internal details of each of the processing cores 110-B to 110-N is not shown for brevity. In one embodiment, the per-core caches 120 may include memory technologies that may support higher access speeds, which may decrease the latency of instruction and data fetches, for example. In one embodiment, the uncore area 150 may include a memory controller 155, a last level cache LLC 160, a home agent HA 161, a caching agent CA 162, a routing agent RA 163, a global clock/PLL 164, an interface 165, and a power management unit 168.

In one embodiment, the activity sensors 179 may sense the activity occurring within the core 105, the uncore 150, and the GPU 170. In one embodiment, the activity sensors 179 may be provided in the data paths of each block within the core and non-core domains to enable the activity sensors 179 to detect the architectural and data activity values. In one embodiment, to status of each domain stored in the AAL 108 may be used to determine if the domain has entered or exited the power saving state.

In one embodiment, the processing core 110-A may monitor the activity levels of the GPU 170 to determine if the GPU has entered a power saving state such as C2, C3, C6, or C7. In one embodiment, the processing core 110-A may send a first signal to the power management unit 168 or the processing core 110-A may send the first signal, directly, to the interrupt generation unit 180. In one embodiment, the processing core 110-A may monitor the architectural or data activity values of the GPU 170. In other embodiments, the processing core 110-A may retrieve the activity values from the GPU 170 and then determine whether the GPU is entering or exiting a power saving state. In such a situation, the processing core 110-A may read the AAL values or any other status values from the registers of the GPU 170. In one embodiment, the processing core 110-A may send the first signal after determining that the GPU 170 is entering the power saving state.

In one embodiment, the power management unit 168 may generate a first update signal in response to receiving the first signal. In one embodiment, the first update signal may be sent to the interrupt generation unit 180. In one embodiment, the power management unit 168 may generate a second update signal in response to receiving the second signal from the processing core 110-A, for example. In one embodiment, the second update signal may be sent to the interrupt generation unit 180. In one embodiment, the power management unit 168 may receive the actual residency time values of the non-core domain in the power saving states and based on the actual residency time, the power management unit 168 may determine the optimal power state (P-state) for the processor 101. In one embodiment, the power management unit 168 may control the clock frequency or the voltage provided to the processor 101 based, at least in part, on the actual residency time values of the one or more non-core domains such as GPU 170 and the uncore 150.

In one embodiment, the power management unit 168 is depicted as a single block within the uncore 150 however, the power management function may be distributed among the domains 105, 150, and 170. In other embodiment, each processing core 110, each block within the uncore 150 and the GPU 170 may have an independent power management unit, which may control the power values provided to processing cores 110 and the blocks within the uncore 150 and the GPU 170.

In one embodiment, the interrupt generation unit 180 may generate a first interrupt in response to receiving the first signal or the first updated signal. In one embodiment, the first interrupt may indicate that the non-core domain such as the GPU 170 may be entering a power saving state (or C-state Cx, for example). In one embodiment, the interrupt generation unit 180 may generate a second interrupt in response to receiving the second signal or the second update signal. In one embodiment, the second interrupt may indicate that the non-core domain such as the GPU 170 may be exiting the power saving state (Cx). In one embodiment, the interrupts generated by the interrupt generation unit 180 may be in the form of pairs and may be identified by identifier associated with the interrupt.

For example, the first interrupt and the second interrupt may be used to determine the actual residency time of the GPU 170 in a power state Cx, thus the first interrupt (IF_170_x) and the second interrupt (SI_170_x) my be identified by the non-core domain identifier (i.e., 170 for the GPU) and then the power saving state (i.e., Cx) identifier. Like-wise, the first (IF_170_y) and second interrupts (SI_170_y) may represent a pair for measuring the residency state of the GPU 170 in the power saving state Cy. Also, the first (IF_150_y) and second interrupts (SI_150_y) may represent a pair for measuring the residency state of the uncore 150 in the power saving state Cy.

In one embodiment, the drivers 190 or the OS 195 may use the first interrupt (IF_170_x) to initiate the counters/timers 175 with a start value (or first value). In one embodiment, the onset of the counters/timers 175 indicates that the GPU 170 has entered the power saving state Cx. In one embodiment, the drivers 190 or the OS 195 may stop or halt the counters/timers 175 in response to receiving the second interrupt (SF_170_x). In one embodiment, the drivers 190 may represent a graphics driver. In one embodiment, the counter/timers 175 us shown as a separate block within the processor 101 for clarity. But, the counters/timers block 175 may be provided within the core 105, uncore 150, or the GPU 170.

Figure 2:
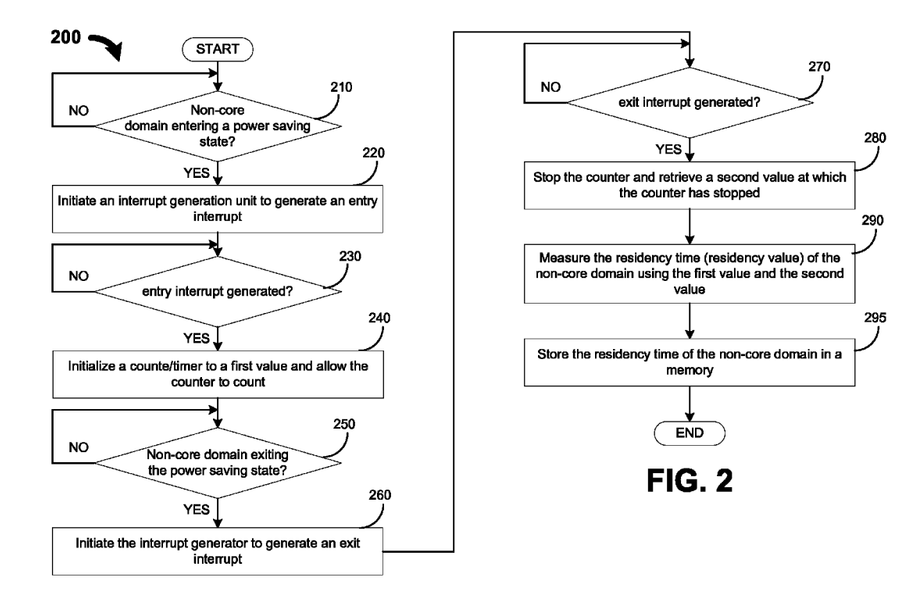
FIG. 2 is a flow-chart 200, which illustrates a technique by which the processor may determine the residency time of one or more non-core domains in the power saving states in accordance with one embodiment.

FIG. 2 illustrates a flow-chart depicting the operation of the processor 100, which may determine an optimal power saving state for the processor based on the actual residency time of the non-core domain in a power saving state in accordance with an embodiment.

In block 205, the processing core such as the processing core 110-A may determine whether the non-core domain (for example, the GPU 170) is entering a power saving state (Cx, for example) and control passes to block 220 if the non-core domain is entering a power saving state and loops back otherwise. In one embodiment, the processing core 110-A or any other component such as a power management unit 168, a dedicated micro-controller, a logic circuitry, firmware, software, or a combination of any of the components thereof may determine whether the non-core domain is entering the power saving state and may use contents of the status values in registers such as the AAL 108 to make such a determination.

In one embodiment, the AAL 108 may store the activity levels, workload levels, utilization levels, instruction throughput, thermal levels, voltage, current, clock frequency values and such other status values of the processing core 110-A and also the non-core domain 170. In one embodiment, the activity levels, workload levels, utilization levels, instruction throughput, thermal levels, voltage, current and frequency values may be acquired using dedicated sensors or detection devices provided for monitoring the status values. In other embodiment, the non-core domain 170 may have registers to store the status values and the processing core 110-A may retrieve such status values to determine whether the non-core domain 170 is entering or exiting the power saving state. In other embodiment, the processing core 110-A may receive the status of the non-core domain 170 and the non-core domain 170 may determine whether the non-core 170 is entering or exiting the power saving state.

In block 220, the processing core 110-A or the power control unit 168 may initiate the interrupt generation unit 180 by, respectively, sending a first signal or a first updated signal to the interrupt generation unit 180.

In block 230, the OS 195 or the device driver 190 may check whether the entry interrupt (or the first interrupt) is generated by the interrupt generation unit 180 and control passes to block 240 if the entry interrupt is generated and loops back otherwise.

In block 240, the OS 195 or the device driver 190 may initialize the counters/timers 175 to a first value (or start value) and may allow the counters/timers 175 to count. In one embodiment, the counters/timers 175 may be provided with a clock signal and the frequency of the clock signal may be set such that the value registered by the counters/timers 175 may represent the actual residency time of the non-core domain in the power saving state.

In block 250, the processing core such as the processing core 110-A may determine whether the non-core domain (for example, the GPU 170) is exiting the power saving state (Cx) and control passes to block 260 if the non-core domain exits the power saving state and loops back otherwise. In one embodiment, the processing core 110-A or any other component such as a power management unit 168, a dedicated micro-controller, a logic circuitry, firmware, software, or a combination of any of the components thereof may determine whether the non-core domain is exiting the power saving state and may use contents of the activity or status registers such as the AAL 108 to make such a determination. In one embodiment, the processing core 110-A may status values, as described above, to determine whether the non-core domain 170 is exiting the power saving state.

In block 260, the processing core 110-A or the power control unit 168 may initiate the interrupt generation unit 180 by, respectively, sending a second signal or a second updated signal to the interrupt generation unit 180.

In block 270, the OS 195 or the device driver 190 may check whether an exit interrupt (or the second interrupt) is generated by the interrupt generation unit 180 and control passes to block 280 if the exit interrupt is generated and loops back otherwise.

In block 280, the OS 195 or the device driver 190 may stop or halt the counters/timers 175 to and the second value (or the final value) registered by the counters/timers 175 may be retrieved and stored in a register.

In block 290, the power management unit 168 may measure or determine the residency time of the non-core domain such as the GPU 170 in the power saving state Cx. In one embodiment, the power management unit 168 may determine the actual residency time using the first (or start) and the second (final) values. In block 295, the power management unit 168 may store the actual residency time of the non-core domain in memory such as a residency time register RTR 168-1.

Figure 3:
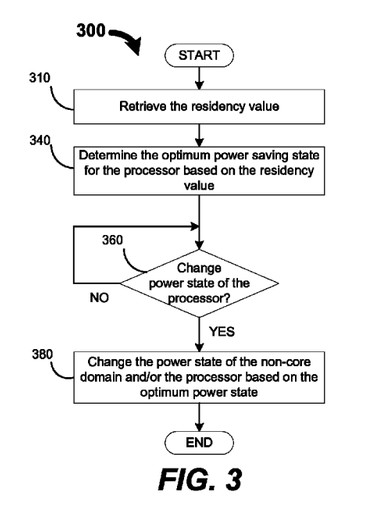
FIG. 3 illustrates a flow-chart 300, which illustrates a technique by which the processor may determine a power state (P-state) for the processor based on the residency time of one or more non-core domains in accordance with one embodiment.

FIG. 3 illustrates a flow-chart depicting the operation of the power management unit, which may determine an optimal power saving state for the processor based on the actual residency time of the non-core domain in a power saving state in accordance with an embodiment.

In block 310, the power management unit 168 may retrieve the actual residency time value stored in a register such as the RTR 168-1. In block 340, the power management unit 340 may determine the optimum power saving state (P-state) for the non-core domain (such as the GPU 170) or the processor 101 or both the non-core domain (such as the GPU 170) and the processor 101 based on the actual residency time value stored in the RTR 168-1. In one embodiment, the power management unit 168 may use the actual residency time value to determine the optimal power saving state (P-state) for the processor 101 and as a result, the optimal power saving state (Px, for example) may be different from the non-optimal power saving state (Pk), which may otherwise be determined based on the estimated residency time values.

In block 360, the power management unit 168 may check whether the power state has to be changed from PL, for example, to Px to utilize the power saving opportunities provided by measurement of the actual residency time value. Control passes to block 380 if the power state has to be changed from PL to Px and loops back otherwise.

In block 380, the power management unit 168 may change the power state of the processor 101 from PL state to Px state based on the optimum power state determined by the power management unit 168 in block 340.

Figure 4:
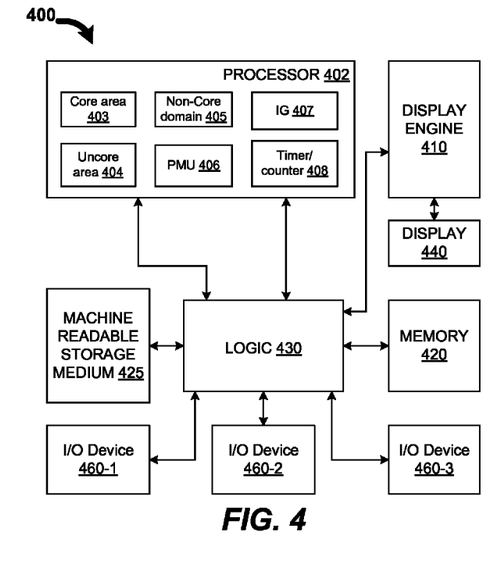
FIG. 4 illustrates a computer system 700, which may determine the residency time of one or more non-core domains in the power saving states in accordance with one embodiment.

FIG. 4 illustrates a computer system 400, which may support determine an optimal power saving state for the processor based on the actual residency time of the non-core domain in a power saving state, in accordance with one embodiment. The computer system 400 may include a processor 402, which may include multiple domains such as core area 403, uncore area 404, non-core domain 405, and a power management unit PMU 406, and an interrupt generator 407. For example, the core area may include many processing cores and the uncore area may include a memory controller, last level cache, home agent, caching agent, routing agent, global clock or PLL, and interface. Further, the non-core domain 405 may represent a graphics processing unit GPU. In one embodiment, the domains may include a single instruction multiple data (SIMD) processor. In one embodiment, the processing cores, interrupt generation unit 407 and the PMU 406 may together operate cooperatively to determine the actual residency time of the non-core domain 407 in a power saving state (Cx) and the actual residency time values may be used to determine an optimal power saving state (Px) for the processor 402 as described above. The processor 402 may support various device drivers including the graphics device drivers.

The processor 402 that operates the computer system 400 may be one or more processor cores coupled to logic 430. The logic 430 may be coupled to one or more I/O devices 460, which may provide interface the computer system 400. The logic 430, for example, could be chipset logic in one embodiment. The logic 430 is coupled to the memory 420, which can be any kind of storage, including optical, magnetic, or semiconductor storage. The non-core domain 405 such as the graphics processor unit may be coupled through a frame buffer to a display 440. In one embodiment, the machine readable storage medium 425 may include an operating system. In other embodiment, the memory 420 may store the operating system.

In one embodiment, the processor 402 may determine the actual residency time of the non-core domain 405 in a power saving state(s) and based on the actual residency time the processor 402 may determine an appropriate P-state for the processor 402. In one embodiment, the processing cores may determine whether the non-core domain 405 is entering a power saving state (Cx, for example) and may generate an initiation signal to the interrupt generator IG 407, which in turn may generate a first interrupt (or entry interrupt). In one embodiment, the device drivers or an operating system may use the first interrupt to start timer/counter 408.

In one embodiment, the IG 407 may receive a second signal in response to the non-core domain exiting the power saving state. In one embodiment, the processing core may send the second signal to the IG 407. In one embodiment, the OS or the device driver or one of the processing cores may send a stop or halt signal to the timer/counter 408. In one embodiment, a final value registered by the timer/counter 408 may be stored in a register. In one embodiment, the final value and the first value may be used to determine the actual residency time of the non-core domain 405 while residing in a power saving state (Cx). In one embodiment, the actual residency time values may be used to determine an optimal power saving state (P-state) for the processor 402. As a result, the optimal power saving state chosen for the processor 402 may provide opportunities to save conserve more power compared to the power saving state chosen based on an estimate of the actual residency time.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
   a plurality of domains including a core domain and a non-core domain,
   an interrupt generator to generate a first interrupt in response to the non-core domain entry into a power saving state and a second interrupt in response to the non-core domain exit from the power saving state, wherein an operating system is to initiate a timer of the processor in response to occurrence of the first interrupt and to halt the timer in response to occurrence of the second interrupt, and
   a power management unit to determine an actual residency time of the non-core domain in the power saving state by use of a first value and a second value, wherein the first value is to be registered in the timer in response to the timer initiation and the second value is to be registered in the timer in response to the timer halt, wherein the actual residency time of the non-core domain is to be used to control a power state of the non-core domain.

2. The processor of claim 1, wherein the power management unit is to determine an optimal power saving state for the processor based on the actual residency time.

3. The processor of claim 1, the core domain further includes a plurality of processing cores, wherein a processing core of the plurality of cores is to generate a first signal in response to the non-core domain entry into the power saving state.

4. The processor of claim 3, wherein the processing core is to determine the non-core domain power saving state entry based on activity values of the non-core domain.

5. The processor of claim 4, wherein the processing core includes a register to store status values including the activity values, thermal values, instruction throughput, workloads, utilization values, voltage, current and frequency values related to the non-core domain, wherein the processing core is to determine that the non-core domain is entering the power saving state based on one or more of the status values.

6. The processor of claim 5, wherein the processing core is to determine the entry to and exit from the power saving state based on the status values, wherein the non-core domain is to provide a status update to the processing core and the status update is to indicate whether the non-core domain is entering or exiting the power saving state.

7. The processor of claim 1, wherein the power management unit further includes a residency time register to store the actual residency time of the non-core domain in different power saving states and the power management unit is to change a power saving state of the processor based at least in part on the actual residency time of the non-core domain.

8. A method comprising:
   generating a first interrupt in response to a non-core domain of a processor entering a power saving state and a second interrupt in response to the non-core domain exiting the power saving state, wherein the processor includes a plurality of domains including a core domain and the non-core domain,
   initiating a timer in response to occurrence of the first interrupt and halting the timer in response to occurrence of the second interrupt, wherein an operating system is to initiate and halt the timer, and
   determining an actual residency time of the non-core domain in the power saving state using a first value and a second value, wherein a power management unit is to use the first value and the second value to determine the actual residency time, wherein the first value is registered in the timer in response to initiating the timer and the second value is registered in the timer in response to halting the timer, wherein the actual residency time of the non-core domain is used to control a power state of the non-core domain.

9. The method of claim 8, further comprising determining an optimal power saving state for the processor based on the actual residency time.

10. The method of claim 8, further comprising generating a first signal in response to the non-core domain entering the power saving state.

11. The method of claim 10, further comprising determining that the non-core domain is entering the power saving state based on activity values of the non-core domain.

12. The method of claim 11, further comprising storing status values in a register, wherein the status values include at least one of the activity values, thermal values, instruction throughput, workloads, utilization values, voltage, current and frequency values related to the non-core domain, and determining that the non-core domain is entering the power saving state based on one or more of the status values.

13. The method of claim 12, further comprising receiving a status update from the non-core domain, and determining the entry to and exit from the power saving state based on the status values, wherein the status update is to indicate whether the non-core domain is entering or exiting the power saving state.

14. The method of claim 8, further comprising storing the actual residency time of the non-core domain in different power saving states in a residency time register, and changing the power saving state of the processor based at least in part on the actual residency time of the non-core domain.

15. A computer system comprising:
    a plurality of input-output devices,
    a non-transitory machine readable medium including instructions, at least some of the instructions comprising an operating system, wherein the operating system is to initiate a timer in response to occurrence of a first interrupt and to halt the timer in response to occurrence of a second interrupt,
    a logic,
    a processor, wherein the processor includes:

a core domain and a non-core domain, an interrupt generator to generate the first interrupt in response to the non-core domain entry into a power saving state and the second interrupt in response to the non-core domain exit from the power saving state, and a power management unit to determine an actual residency time of the non-core domain in the power saving state by use of a first value and a second value, wherein the first value is to be registered in the timer in response to the timer initiation and the second value is to be registered in the timer in response to the timer halt, wherein the actual residency time of the non-core domain is to be used to control a power state of the non-core domain.

16. The computer system of claim 15, wherein the power management unit further includes a residency time register to store the actual residency time of the non-core domain in different power saving states, wherein the power management unit is to change a power saving state of the processor to an optimal power state based at least in part on the actual residency time of the non-core domain.

17. The computer system of claim 16, wherein the core domain further includes a plurality of processing cores, wherein a processing core of the plurality of cores is to generate a first signal in response to the non-core domain entry into the power saving state.

18. The computer system of claim 17, wherein the processing core is to determine that the non-core domain is entering the power saving state based on activity values of the non-core domain.

19. The computer system of claim 18, wherein the processing core includes a register to store status values including the activity values, thermal values, instruction throughput, workloads, utilization values, voltage, current and frequency values related to the non-core domain, wherein the processing core is to determine that the non-core domain is entering the power saving state based on one or more of the status values.

20. The computer system of claim 19, wherein the processing core is to determine the entry to and exit from the power saving state based on the status values, wherein the non-core domain is to provide a status update to the processing core and the status update is to indicate whether the non-core domain is entering or exiting the power saving state.

* * * * *